United States Patent
Quinn et al.

(10) Patent No.: US 6,463,199 B1
(45) Date of Patent: Oct. 8, 2002

(54) FIBER OPTIC CABLES WITH AT LEAST ONE WATER BLOCKING ZONE

(75) Inventors: Christopher M. Quinn, Hickory; Donald R. Parris, Newton, both of NC (US)

(73) Assignee: Corning Cable Systems LLC, Hickory, NC (US)

( * ) Notice: Subject to any disclaimer, the term of this patent is extended or adjusted under 35 U.S.C. 154(b) by 10 days.

(21) Appl. No.: 09/677,222

(22) Filed: Sep. 29, 2000

Related U.S. Application Data

(63) Continuation-in-part of application No. 09/322,625, filed on May 28, 1999, now Pat. No. 6,374,023.

(51) Int. Cl.[7] .................................................. G02B 6/44
(52) U.S. Cl. ..................................................... 385/109
(58) Field of Search ................................. 385/109, 113, 385/114, 112

(56) References Cited

U.S. PATENT DOCUMENTS

| | | | |
|---|---|---|---|
| 3,607,487 A | 9/1971 | Biskeborn et al. | 156/47 |
| 3,711,262 A | 1/1973 | Keck et al. | 65/3 |
| 3,717,716 A | 2/1973 | Biskeborn et al. | 174/25 R |
| 3,843,568 A | 10/1974 | Woodland et al. | 260/2.5 B |
| 3,879,575 A | 4/1975 | Dobbin et al. | 174/92 |
| 3,884,550 A | 5/1975 | Maurer et al. | 350/96 |
| 4,176,240 A | 11/1979 | Sabia | 174/23 |
| 4,279,470 A | 7/1981 | Portinari et al. | 350/96.23 |
| 4,351,913 A | 9/1982 | Patel | 523/218 |
| 4,464,013 A | 8/1984 | Sabia | 350/96.23 |
| 4,497,538 A | 2/1985 | Patel | 350/96.23 |
| 4,509,821 A | 4/1985 | Stenger | 350/96.23 |
| 4,701,016 A | 10/1987 | Gartside, III et al. | 350/96.23 |
| 4,705,571 A | 11/1987 | Lange et al. | 106/287.1 |
| 4,723,831 A | 2/1988 | Johnson et al. | 350/96.23 |
| 4,730,894 A | 3/1988 | Arroyo | 350/96.23 |
| 4,763,982 A | 8/1988 | Greveling | 350/96.23 |
| 4,770,489 A * | 9/1988 | Saito et al. | 385/113 |
| 4,776,910 A | 10/1988 | Taylor et al. | 156/145 |
| 4,798,853 A | 1/1989 | Handlin, Jr. | 523/173 |
| 4,810,395 A | 3/1989 | Levy et al. | 252/28 |
| 4,818,060 A | 4/1989 | Arroyo | 350/96.23 |
| 4,822,133 A | 4/1989 | Peacock | 350/96.23 |
| 4,826,278 A | 5/1989 | Gartside, III et al. | 350/96.23 |
| 4,844,575 A | 7/1989 | Kinard et al. | 350/96.23 |

(List continued on next page.)

FOREIGN PATENT DOCUMENTS

| | | | | |
|---|---|---|---|---|
| DE | 42 07 594 A1 | 3/1992 | | G02B/6/44 |
| WO | WO97/22028 | 6/1997 | | G02B/6/44 |

OTHER PUBLICATIONS

American Society for Testing and Materials, "Standard Test Method for Rubber Property—Durometer Hardness", Jun. 26, 1997.

*Primary Examiner*—Tulsidas Patel
(74) *Attorney, Agent, or Firm*—Timothy J. Aberle

(57) ABSTRACT

A fiber optic cable comprises a jacket defining an interior passageway therethrough, at least one optical fiber disposed in the interior passageway of the outer jacket, and a water blocking zone having, for example, a solid polymer foam material contacting and surrounding at least one optical fiber over at least a portion of a length thereof and filling a space between at least one optical fiber and the inner wall of the cable. The invention is applicable to many different configurations of fiber optic cables, including those having one or more buffer tubes containing the optical fiber(s) as well as cables without any buffer tube. The optical fibers can be in loose and unbundled form, in bundled arrangements, or in ribbonized form. The water blocking zone preferably is relatively soft and resilient, and can be in the form of discrete foamed or non-foamed portions spaced apart along the length of the cable.

28 Claims, 2 Drawing Sheets

U.S. PATENT DOCUMENTS

| | | |
|---|---|---|
| 4,942,270 A | 7/1990 | Gamarra ...................... 174/93 |
| 5,049,593 A | 9/1991 | Marciano-Agostinelli et al. .......................... 523/173 |
| 5,149,736 A | 9/1992 | Gamarra ...................... 524/490 |
| 5,224,192 A | 6/1993 | Wagman ...................... 385/112 |
| 5,247,599 A * | 9/1993 | Vyas et al. ................... 385/113 |
| 5,262,468 A | 11/1993 | Chen ........................... 524/476 |
| 5,343,549 A | 8/1994 | Nave et al. .................. 385/103 |
| 5,408,564 A * | 4/1995 | Millsa ......................... 385/128 |
| 5,657,410 A | 8/1997 | Fehn et al. .................. 385/102 |
| 5,671,312 A | 9/1997 | Jamet .......................... 385/100 |
| 5,698,615 A | 12/1997 | Polle ........................... 523/173 |
| 5,737,469 A | 4/1998 | Costello et al. ............. 385/109 |
| 5,911,023 A | 6/1999 | Risch et al. ................. 385/100 |
| 5,994,450 A | 11/1999 | Pearce ......................... 524/505 |
| 6,041,153 A | 3/2000 | Yang ........................... 385/109 |
| 6,066,397 A * | 5/2000 | Risch et al. ................. 428/379 |
| 6,122,424 A * | 9/2000 | Bringuier .................... 385/100 |
| 6,178,278 B1 | 1/2001 | Keller et al. ................ 385/109 |
| 6,253,012 B1 | 6/2001 | Keller et al. ................ 385/109 |

* cited by examiner

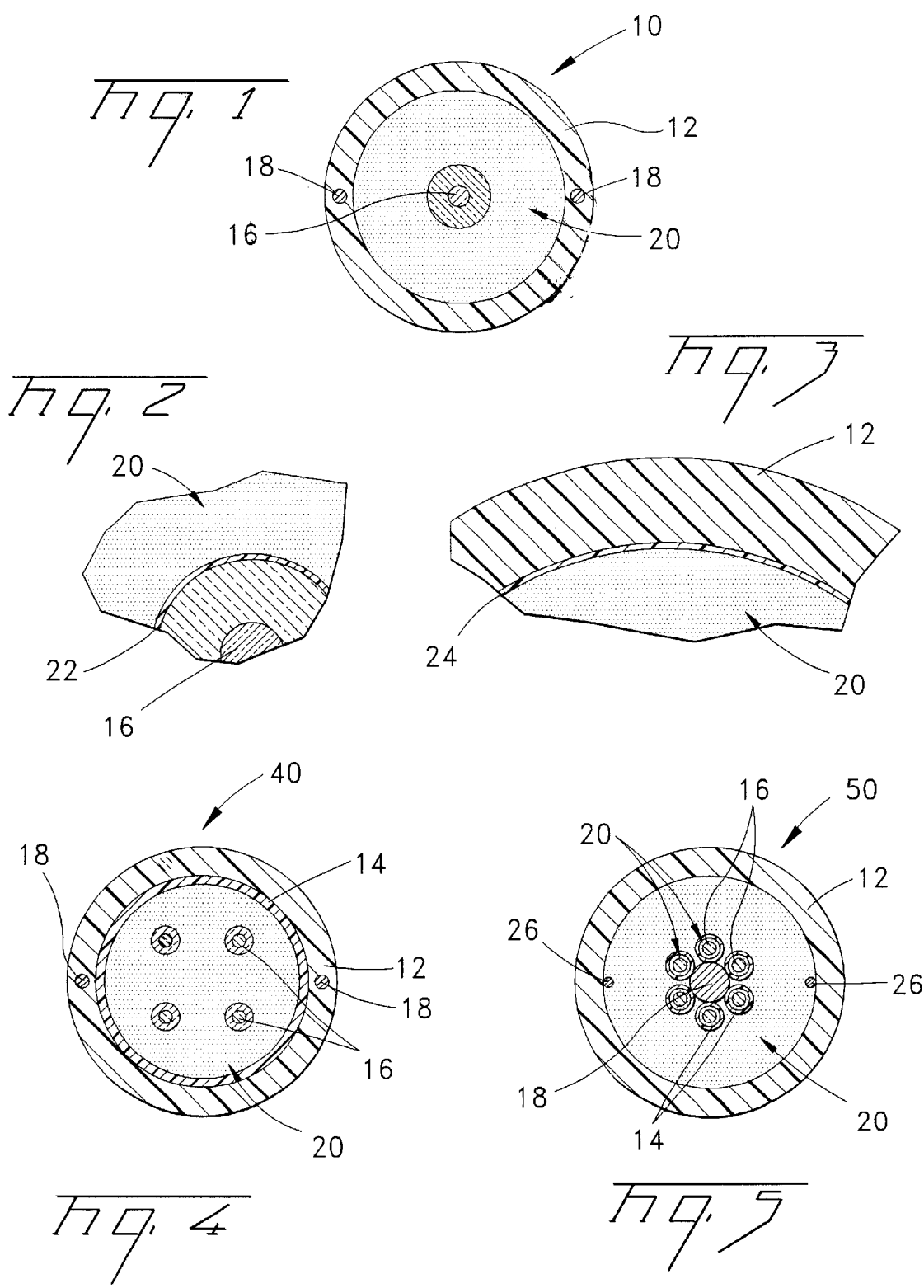

FIBER OPTIC CABLES WITH AT LEAST ONE WATER BLOCKING ZONE

CROSS-REFERENCE TO RELATED APPLICATIONS

This is a Continuation-in-part of U.S. Ser. No. 09/322,525 filed May 28, 1999 now U.S. Pat. No. 6,374,023, which is incorporated herein by reference.

FIELD OF THE INVENTION

The present invention relates to fiber optic cables and, more particularly, to fiber optic cables having at least one water blocking feature.

BACKGROUND OF THE INVENTION

A fiber optic cable generally comprises a jacket, strength members, and one or more optical fibers disposed within the passageway of the jacket or within one or more buffer tubes disposed within the passageway. Fiber optic cables that are intended for outdoor or indoor/outdoor use generally also include elements for preventing or mitigating the effects of water that may infiltrate into the interior passageway(s) of the cable. In particular, it is undesirable to allow water to migrate longitudinally along the passageway(s) of the cable because the water may reach cable closures or connectors, which can be damaged by exposure to the water. Accordingly, many fiber optic cables include water blocking elements for preventing migration of water longitudinally along the cable interior.

A commonly used technique for preventing water migration through the cable is to fill the interior passageway(s) of the cable with a petroleum based grease-like compound. However, there are many disadvantages attendant to the use of such compounds. For this reason, "dry" fiber optic cables have been developed. A dry fiber optic cable typically includes a water swellable element that swells when exposed to water so as to form a blockage in the cable preventing water from flowing past the blockage. The water swellable element often comprises a superabsorbent polymer composition coated on or impregnated in a yarn or tape that is wrapped about the fiber(s) all along the length thereof.

Such water swellable yarns or tapes are effective in preventing water migration through a cable. A drawback of their use, however, is that they can restrict free movement of the fiber(s) within the cable passageway(s), which movement is desirable during thermal elongation or contraction of the cable. As a result, the water swellable yarns or tapes can affect the attenuation performance of the cable relative to that of a comparable grease-containing cable.

SUMMARY OF THE INVENTION

An aspect of the present invention comprises a fiber optic cable with a small outside diameter and a non-petroleum based water blocking zone, comprising a cable jacket, at least one optical fiber disposed within the cable jacket, with the water blocking zone at least partially filling the cable. The water blocking zone comprising a soft, solid material having a three-dimensional network of bonding, defining a multifunctional component. The water blocking zone provides water blocking, defines a buffer that allows desirable levels of optical fiber movement, and is operative to cushion mechanical loads. The water blocking zone preferably comprises a thermoplastic or thermoset material. The water blocking zone can comprise a foamed or non-foamed material.

BRIEF DESCRIPTION OF THE DRAWINGS

FIG. 1 is a cross-sectional view of a fiber optic cable in accordance with the present inventions.

FIG. 2 is a cross-sectional view of a juncture between the water blocking zone and an optical fiber, showing a material disposed between the water blocking zone and the fiber for producing a controlled bond.

FIG. 3 is a fragmentary, enlarged cross-sectional view of the juncture between the water blocking zone and the inner surface of the outer jacket, showing a material disposed between the water blocking zone and the jacket for producing a controlled bond.

FIG. 4 is a cross-sectional view of a single buffer tube fiber optic cable in accordance with the present inventions.

FIG. 5 is a cross-sectional view of a multi-tube fiber optic cable in accordance with the present inventions.

DETAILED DESCRIPTION OF THE INVENTION

Figure 6:
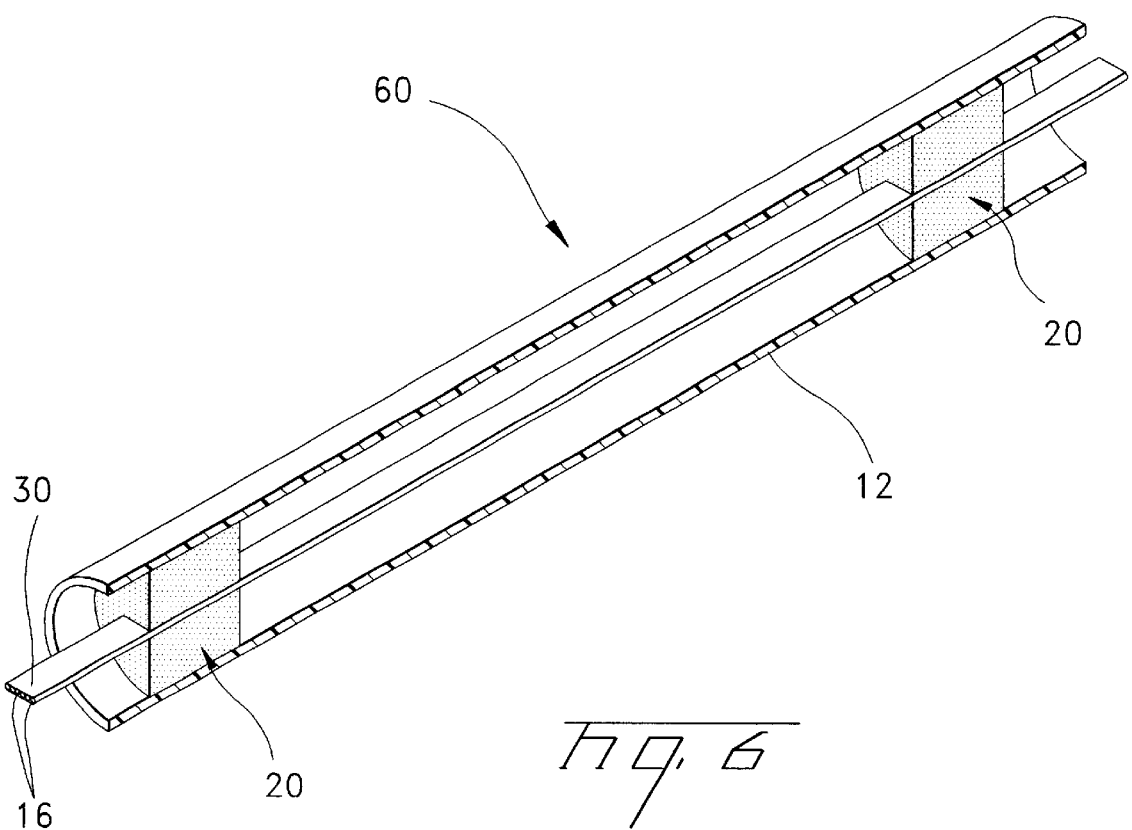
FIG. 6 is a sectioned isometric view of a fiber optic ribbon cable in accordance with the present inventions, showing intermittent water blocking zones spaced apart along the cable.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 shows a first configuration of a fiber optic cable 10 to which the present inventions can be applied. Fiber optic cable 10 is preferably a tubeless cable, meaning that it preferably does not include a buffer tube. Fiber optic cable 10 includes a cable jacket 12 with an OD preferably under about 25 mm, and most preferably under about 10.0 mm. Cable jacket 12 defines an interior passageway having at least one optical component, e.g., an optical fiber 16 disposed therein. A layer of armor (not shown) can be in contact with the jacket. The optical component is preferably a single optical fiber 16 as shown in FIG. 1, or a plurality of optical fibers 16 either unbundled or in one or more bundles, tubes, or optical ribbons. In a preferred embodiment, jacket 12 includes tensile and/or anti-buckling members 18 that can be, for example, glass fiber rovings, aramid fibers, fiber reinforced plastics or glass reinforced plastics. Optical fiber 16 generally includes a silica-based core that is operative to transmit light and is surrounded by a silica-based cladding having a lower index of refraction than the core. A soft primary coating surrounds the cladding, and a relatively rigid secondary coating surrounds the primary coating. Optical fiber 16 can be, for example, a single-mode or multi-mode fiber available commercially from Corning Incorporated.

Fiber optic cable 10 preferably includes a water blocking zone 20 surrounding optical fiber 16 and preferably filling the space between optical fiber 16 and the inner surface of outer jacket 12. Characteristics of water blocking zone 20 include preferably a substantial lack of petroleum based grease compositions, but may include a small fraction of oil or a plasticizer. Water blocking zone 20 may include a super absorbent polymer suitable for use in a cable. It is preferably a soft, solid material comprising a three-dimensional network of preferably covalent, hydrogen, and/or Van der Walls bonding, and can be foamed or non-foamed. In addition, water blocking zone is multifunctional, as it provides water blocking, and defines a buffer that allows desirable levels of fiber movement and cushions lateral mechanical loads. Preferably, water blocking zone 20 intimately contacts the outer surface of optical fiber 16 and the inner surface of outer jacket 12, and preferably forms a generally full 360° disc or cylinder structure, i.e., a structure whose outer periphery matches the shape of the inner surface of outer jacket 12 so that there is no open passage through water blocking zone 20. Water blocking zone 20 preferably comprises thermoplastic or thermoset materials. In addition, water blocking zone 20 can include super absorbent materials.

A thermoplastic material, such as described in U.S. patent application Ser. No. 09/322,625, which is incorporated by reference herein, can define a suitable three-dimensional network. Preferably, the thermoplastic polymer melts and flows at temperatures above about 80° C., most preferably about 90° C. to about 125° C. This allows the polymer to be melted and introduced into jacket 12 during cable manufacture. Further, the filling material containing the three-dimensional network maintains its three-dimensional characteristics at as high as about 80° C. to inhibit dripping, and is sufficiently soft at as low as about –50° C. to avoid undue optical performance degradation.

The thermoplastic polymers employed may include, but are not limited to, thermoplastic elastomers and rubbers that will form the three-dimensional network singly or in combination. Desirable thermoplastic elastomers include block copolymers having hard and soft polymeric units such as block copolymers of styrene and butadiene, block copolymers of styrene and isoprene, block copolymers of styrene and ethylene and/or butylene; and polyurethane elastomers and elastomeric alloys. Desirable thermoplastic rubbers include olefinic rubbers such as ethylene or propylene containing rubber, and other olefinic rubbers that can be plasticized sufficiently to achieve the desired softness.

In a preferred embodiment, the thermoplastic polymer employed is a block copolymer. Such copolymers are available from Shell Chemicals under the tradename KRATON™ polymers and compounds. KRATON™ polymers are high performance thermoplastic elastomers.

Certain KRATON™ block copolymers are particularly suitable for use with the present invention due to an unusual combination of softness and low viscosity for easy thermoplastic processing at elevated temperatures or in solution. The KRATON™ block copolymers are available as linear, diblock, triblock and radial polymers. Each molecule of KRATON™ block copolymer includes block segments of styrene monomer units and rubber monomer units. The most common structures are the linear A-B-A block types: styrene-butadiene-styrene (SBS) and styrene-isoprene-styrene (SIS).

The desired thermoplastic polymers of the present invention include rigid end blocks and a soft middle block. For example, the A-B-A structure of the KRATON™ block copolymers has polystyrene endblocks and an elastomeric midblock. Prior to processing, the polystyrene endblocks are associated in rigid domains. Physical bonding via these domains yields a continuous three dimensional network. During processing, in the presence of heat and shear or solvent, the polystyrene domains soften and permit flow. After cooling or solvent evaporation, the polystyrene domains reform and harden, locking the three-dimensional network in place. The physical bonding and reinforcing effect of the styrene domains provide strength, and the rubber midblock provides elasticity.

Of special interest are the KRATON™ G polymers. A particularly preferred block copolymer of the KRATON™ G series is a second generation polymer of the styrene-ethylene/butylene-styrene (SEBS) type. The polymers exhibit superior ozone resistance and can withstand prolonged outdoor exposure. Further, these polymers may be made, in accordance with the present invention with a sufficient softness such that they do not cause a large compressive strain on the optical fibers. The thermoplastic filling materials of the present invention may include one or more additives to achieve superior appearance, performance and/or processing properties. These additives may include, but are not limited to plasticizers, lubricants, foaming agents, heat stabilizers, flame retardants, antioxidants, pigments, dyes and fillers. In certain embodiments, any one or more of the additives are excluded from the filling materials of the invention, yet in other embodiments, any one or more of the additives may be included. Thermoplastics include SEBS materials, e.g. Kraton.

Water blocking zone 20 can comprise a thermoset material, for example, polyurethane or silicone. Water blocking zone 20 in a preferred embodiment is a relatively soft foamed material, e.g., comparable to that commonly used for seat cushions or the like. Various other polymer materials can be used, including but not limited to polyolefins, polyvinyl chloride, ethylene vinyl acetate, or the like. When foamed, water blocking zone 20 preferably comprises a closed-cell foam, with a cell size of less than about 20 microns, a foaming rate of about 10–90%, and a material softness of about Shore A hardness of less than about 40. The cells can be various shapes, for example, spherical or bubble-like, and can be up to about 1 meter long.

Foamed polymer materials generally are formed either by bringing together two reactive precursor chemicals (e.g., a polyol and an isocyanate in the case of forming polyurethane foam) so as to form a reaction that produces gas that bubbles through the composition as the composition cures, thus forming cells, or by adding a heat-activated physical or chemical blowing agent to a polymer composition and heating the composition to activate the blowing agent, which produces gas. Any suitable technique for producing foamed polymer materials can be used in accordance with the present inventions.

As one example, a liquid foam-forming composition (or two precursor chemicals therefor) can be injected into an extruder cross-head for forming the water blocking zone inside of outer jacket 12 as the optical fibers enter the extruder, thus forming a cylinder of foam around the fibers. Alternatively, water blocking zone 20 could be formed around the optical fiber(s) prior to feeding the fiber(s) to the extruder, and then outer jacket 12 could be extruded over the foam material and fiber(s).

In some cases, it may be desirable to control the degree of bonding between water blocking zone 20 and optical fiber 16 and/or between water blocking zone 20 and outer jacket 12. To these ends, fiber optic cable 10 can include a material 22 between water blocking zone 20 and optical fiber 16 for producing a controlled bond therebetween, and/or can include a material 24 between water blocking zone 20 and outer jacket 12 for producing a controlled bond therebetween. For example, it may be desirable to be able to easily and cleanly strip water blocking zone 20 from optical fiber 16, such as when accessing optical fiber 16 for connectorizing or splicing purposes. In this case, material 22 preferably comprises a TBII layer, as disclosed in U.S. Pat. No. 5,408,564 incorporated by reference herein, or a slip layer comprising an oil material known to have good release properties with the particular foam material employed. As another example, it may be desirable to provide a stronger bond between water blocking zone 20 and outer jacket 12 than would be provided by the natural tendency of the materials in water blocking zone 20 to adhere to the jacket material. In this case, material 24 can comprise an adhesive, for example, a hot melt glue, EAA, or a solvent based adhesive and can include a coloring material. In other applications where it is desired to be able to separate outer jacket 12 from water blocking zone 20, material 24 can comprise a suitable release material.

As previously noted, the present inventions are not applicable to only one type of cable. Indeed, water blocking zone 20 can be used in place of the conventional grease compound anywhere that such compound is typically used. Thus, FIGS. 4 through 6 depict several other exemplary fiber optic cables in accordance with the present inventions.

FIG. 4 depicts a single buffer tube fiber optic cable 40 generally similar to fiber optic cable 10 of FIG. 1, except that outer jacket 12 surrounds a buffer tube 14, and a plurality of optical components are disposed within buffer tube 14. Water blocking zone 20 surrounds optical fibers 16 and fills the space between optical fibers 16 and the inner surface of buffer tube 14. Although not shown in FIG. 4, fiber optic cable 40 can include a material for producing a controlled bond between water blocking zone 20 and optical fibers 16, and/or between water blocking zone 20 and buffer tube 14, if desired.

FIG. 5 depicts a multi-tube fiber optic cable 50 comprising an outer jacket 12, a plurality of buffer tubes 14 disposed within the passageway of outer jacket 12, and a central strength member 18 about which buffer tubes 14 are stranded. Each buffer tube 14 contains at least one optical component 16, and often will contain a plurality of fibers. Central strength member 18 can comprise, for example, steel, loose fibers, or fiber-reinforced plastic. Water blocking zone 20 surrounds each optical fiber 16 inside the respective buffer tube 14 in the space between optical fiber 16 and the inner surface of the buffer tube. Additionally or alternatively, water blocking zone 20 can surround buffer tubes 14 and in the space between buffer tubes 14 and the inner surface of outer jacket 12. Fiber optic cable 50 can also include other cable elements such as ripcords 26, armor jacketing (not shown), or further strength members (not shown). Where the cable includes an armor layer, a water blocking zone 20 can be disposed between the armor and jacket.

FIG. 6 depicts a fiber optic ribbon cable 60 in accordance with the present inventions. Cable 60 includes an outer jacket 12 and an optical ribbon 30 disposed in the interior passageway of outer jacket 12. Optical ribbon 30 comprises a plurality of optical fibers 16 disposed side-by-side in a flat array and bound together by a matrix material typically of plastic. Although only one optical ribbon 30 is shown, it will be understood that cable 60 preferably includes a plurality of such ribbons in a stack, if desired. Water blocking zone 20 surrounds ribbon 30 and fills the space between ribbon 30 and the inner surface of outer jacket 12. FIG. 6 also depicts a further aspect of the present invention, namely, that water blocking zone 20 need not be a continuous structure extending all along the length of cable 60. Thus, a finite length of cable 60 is illustrated in which two discrete foam portions 20 are disposed and are spaced apart along cable 60 at preferably less than a one meter spacing. Of course, although the provision of discrete water blocking zones 20 is illustrated in connection with ribbon cable 60, any of the fiber optic cables previously described herein, or any other fiber optic cable configuration in accordance with the invention, can likewise include such discrete water blocking zones, if desired. The provision of the discrete water blocking zones results in a savings of foam material, and can still provide a water blocking function. In this regard, any water entering cable 60 between two adjacent zones 20 can migrate along cable 60 to either or both of zones 20 but is blocked by the zones from further migrating along the cable. Water blocking zone 20 can also potentially offer an improved fire retardancy, for example, it can include a flame retardant material such as magnesium hydroxide.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fiber optic cable having an outside diameter of less than about 25 mm and a water blocking zone, comprising:
a cable jacket;
at least one optical fiber disposed within the cable jacket; and
said water blocking zone at least partially filling said cable and comprising a soft, solid material having a three-dimensional network of bonding, said water blocking zone being multifunctional, providing water blocking, defining a buffer that allows desirable levels of optical fiber movement, and being operative to cushion mechanical loads.

2. The fiber optic cable of claim 1, wherein said water blocking zone comprises a closed cell polymer foam.

3. The fiber optic cable of claim 1, wherein said water blocking zone comprises a thermoplastic material.

4. The fiber optic cable of claim 1, wherein said water blocking zone comprises a thermoset material.

5. The fiber optic cable of claim 1, wherein said water blocking zone comprises a plurality of discrete portions that are longitudinally spaced apart at regular intervals along the cable.

6. The fiber optic cable of claim 1, further comprising a material disposed between said water blocking material and the at least one optical fiber for producing a controlled bond between said water blocking zone and the at least one optical fiber.

7. The fiber optic cable of claim 6, wherein the material for producing the controlled bond comprises a release material enabling said water blocking zone to be stripped off the at least one optical fiber.

8. The fiber optic cable of claim 1, further comprising a buffer tube disposed in the interior passageway of the outer jacket, the at least one optical fiber being disposed within the buffer tube, and said water blocking zone filling a space between the at least one optical fiber and an inner surface of the buffer tube.

9. The fiber optic cable of claim 8, further comprising a material disposed between said water blocking zone and the inner surface of the buffer tube for producing a controlled bond between said water blocking zone and the inner surface of the buffer tube.

10. The fiber optic cable of claim 1, wherein said water blocking zone extends between and contacts the at least one optical fiber and an inner surface of the outer jacket.

11. The fiber optic cable of claim 10, further comprising a material disposed between said water blocking zone and the inner surface of the outer jacket for producing a controlled bond between said water blocking zone and the inner surface of the outer jacket.

12. The fiber optic cable of claim 1, further comprising at least one strength member disposed in the cable.

13. The fiber optic cable of claim 1, further comprising a plurality of buffer tubes disposed within the outer jacket, each buffer tube containing said water blocking zone with at least one optical fiber embedded therein.

14. The fiber optic cable of claim 13, wherein said water blocking zone is also disposed in a space exteriorly of the buffer tubes.

15. A fiber optic cable, comprising:
  a cable jacket;
  at least one buffer tube within said jacket and containing at least one optical fiber;
  a water blocking zone comprising a solid foam material surrounding the at least one buffer tube over at least a portion of a length thereof and filling a space between the at least one buffer tube and an inner wall of the cable jacket; and
  a material disposed between the at least one buffer tube and said water blocking zone for producing a controlled bond between said water blocking zone and the at least one buffer tube.

16. The fiber optic cable of claim 15, further comprising a plurality of buffer tubes within the passageway of the outer jacket, each buffer tube containing at least one optical fiber, said water blocking zone surrounding each buffer tube.

17. The fiber optic cable of claim 15, wherein said water blocking zone comprises a plurality of discrete foam portions spaced apart longitudinally along the cable at regular intervals.

18. The fiber optic cable of claim 15, said water blocking zone comprising a foam cell size of about 1–20 microns.

19. The fiber optic cable of claim 15, said water blocking zone comprising a foaming rate of about 10–90%.

20. The fiber optic cable of claim 15, said water blocking zone comprising a foam material softness of about Shore hardness A of about 40 or less.

21. A fiber optic cable comprising:
  a central strength member;
  at least one buffer tube having at least one optical fiber therein stranded around said central strength member;
  a water blocking zone comprising a soft, solid material having a three-dimensional network of bonding, said water blocking zone being disposed within a cable jacket.

22. The fiber optic cable of claim 21, wherein said water blocking zone comprises a closed cell polymer foam.

23. The fiber optic cable of claim 21, wherein said water blocking zone comprises a thermoplastic material.

24. The fiber optic cable of claim 21, wherein said water blocking zone comprises a thermoset material.

25. The fiber optic cable of claim 21, further comprising a material disposed between said water blocking zone and the at least one optical fiber for producing a controlled bond between said water blocking zone and the at least one optical fiber.

26. The fiber optic cable of claim 21, said water blocking zone filling a space between the at least one optical fiber and an inner surface of the buffer tube.

27. The fiber optic cable of claim 21, wherein said water blocking zone is disposed in a space exteriorly of said at least one buffer tube.

28. The fiber optic cable of claim 21, said water blocking zone having a Shore A hardness of about 40 or less.

* * * * *